Aug. 9, 1949.  H. G. TURNER  2,478,214
AXIALLY SHIFTING TYPE TIRE REMOVING MACHINE
Filed Nov. 6, 1946  2 Sheets-Sheet 1

INVENTOR.
HOUSTON G. TURNER
BY
*Victor J. Evans & Co.*
ATTORNEYS

Aug. 9, 1949.  H. G. TURNER  2,478,214
AXIALLY SHIFTING TYPE TIRE REMOVING MACHINE
Filed Nov. 6, 1946  2 Sheets-Sheet 2
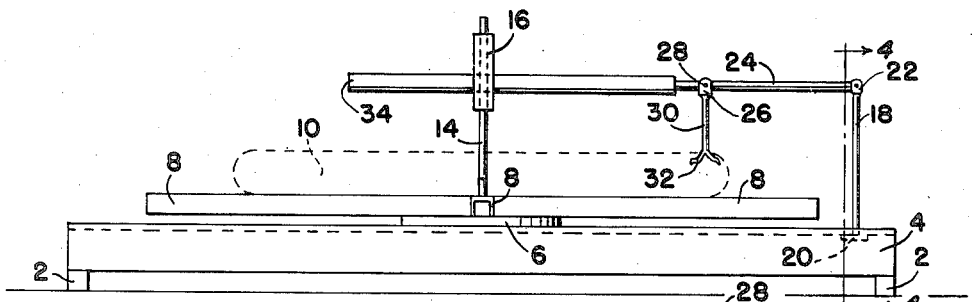
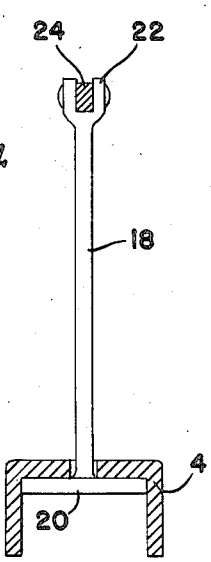
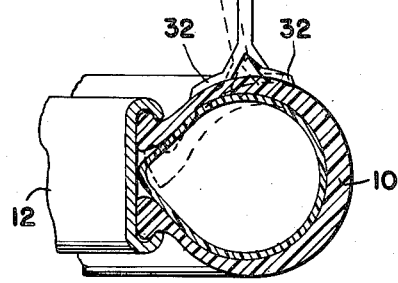
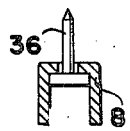
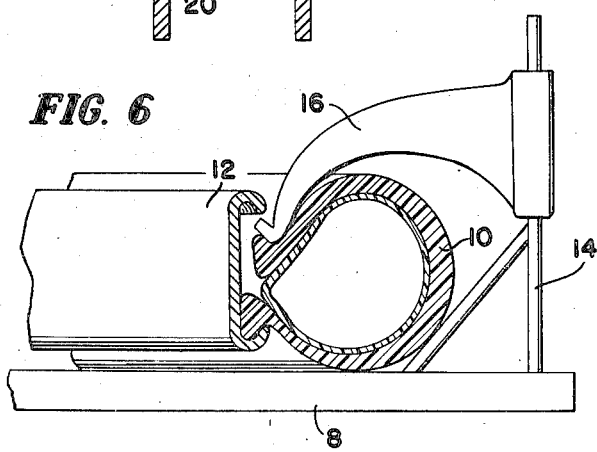
INVENTOR.
HOUSTON G. TURNER
BY
Victor J. Evans & Co.
ATTORNEYS Patented Aug. 9, 1949

2,478,214

UNITED STATES PATENT OFFICE 2,478,214

AXIALLY SHIFTING TYPE TIRE REMOVING MACHINE

Houston G. Turner, Hammon, Okla.

Application November 6, 1946, Serial No. 708,118

1 Claim. (Cl. 157—1.26)

My present invention relates to an improved axially shifting type tire removing machine of the type adapted to quickly and easily remove a tire from a rim or wheel with a minimum of physical effort.

The machine of my invention comprises a combination of parts arranged in a unique and novel manner to accomplish the desired purpose and which construction effects a simple operation, a relatively light weight machine, and one inexpensive to manufacture.

In the accompanying drawings I have illustrated one complete example of the physical embodiment of my invention according to the best mode I have thus far devised but it will be understood that various changes and alterations may be made in the exemplified structure within the scope of the appended claim.

In the drawings:

Figure 3 is an end elevational view.

Figure 4 is a vertical sectional view taken at line 4—4 of Figure 3.

Figure 5 is an enlarged detail view of the tire pressure rod.

Figure 6 is a detail view of the securing means for the loosened tire; and

Figure 7 is a detail view through the frame showing the tire engaging pin.

Figure 1:
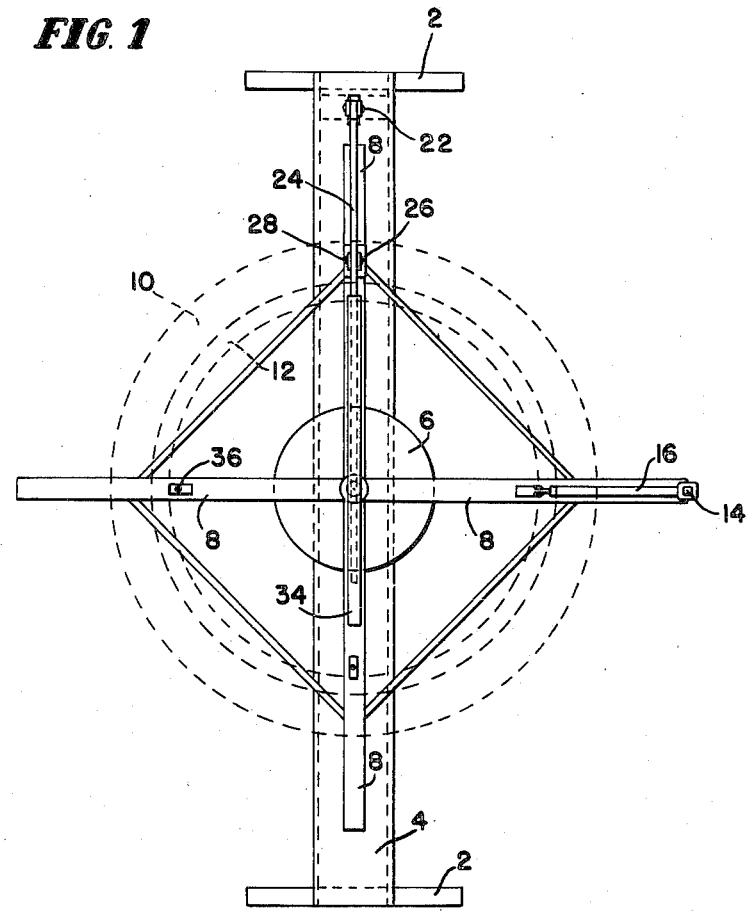
Figure 1 is a top plan view of the tire removing machine of my invention.
Figure 2:
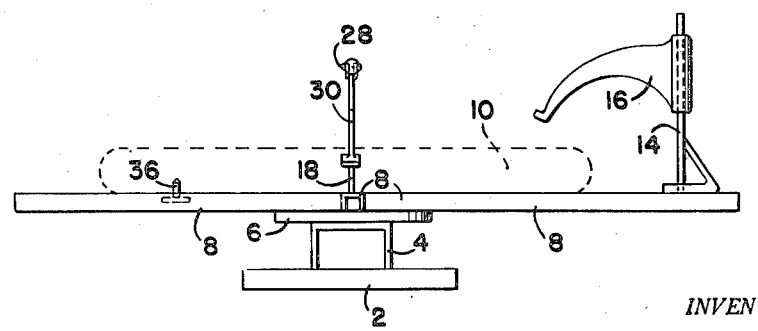
Figure 2 is a side elevational view thereof.

Referring now to the drawings wherein like characters indicate like parts I have illustrated the present embodiment of my invention as comprising a pair of spaced supports 2 of suitable design upon which I have attached a beam forming a base 4 here shown as of a channel or U-shaped material. A disk 6 is mounted on the base 4, and a cruciform frame 8 is rotatably mounted on the base as a turntable for the tire 10 on its rim 12.

Near the outer end of one element of the frame 8, I mount a supporting post 14 and provide an arm 16 thereon which is vertically slidable, and through one end of the base 4 I position a vertical rod 18 having a head 20 within the U-shaped base 4, the rod being formed with an upper fork 22 to receive the rod 24 in pivotal relation.

Intermediate the ends of this rod 24, the fork 26 is secured by bolt 28 and from the fork depends the pressure arm 30 having fingers 32 engageable with the side wall of the tire 10.

An extension 34 on the rod 24 provides for additional leverage, and pins 36 extending upwardly through the arms of the frame 8 engage the inner surface of the rim of the tire positioned on the frame and prevent relative movement thereof.

In operation the tire and its rim are placed on the frame, and the rod 24 is swung upon its pivot on the rod 18 so that the fingers 32 engage the side wall of the tire. Downward pressure is then exerted against the extension and the rod 24 pressing the fingers against the tire and removing the tire from contact with the rim. The slidable arm 16 is pressed between the separated tire and rim to hold the position thereof and the turntable is then rotated so that the tire may be loosened at different points by the pressure arm 30. Thus the tire which often becomes frozen by rust is progressively removed from contact with the rim.

It will be apparent from the above description of the construction and operation of the machine of my invention, that the removal of a tire from its rim or wheel may be accomplished with facility and dispatch, and with a minimum of physical effort obviating the need for conventional tire irons, hammers, and other tools.

Having thus fully described my invention what I claim as new and desire to secure by Letters Patent is:

In a tire removing tool, the combination which comprises, a channel-shaped beam providing a base, a spider with radially disposed arms rotatably mounted on said base, tire and rim positioning means on the arms of said spider, a vertically extending post on the end of one of said arms positioned beyond the outer surface of a tire that may be placed on the spider, a vertically adjustable tire-engaging arm carried by said post, a support on one end of the beam of the base extended perpendicularly thereto, a handle pivotally mounted on said support, and a pressure arm carried by said handle and positioned to engage the surface of a tire on the spider.

HOUSTON G. TURNER.

REFERENCES CITED

The following references are of record in the file of this patent:

UNITED STATES PATENTS

| Number | Name | Date |
|---|---|---|
| 1,116,468 | Nelson | Nov. 10, 1914 |
| 1,208,184 | Mayer | Dec. 12, 1916 |
| 1,538,875 | Stevens | May 19, 1925 |
| 1,804,222 | Mascuch | May 5, 1931 |

FOREIGN PATENTS

| Number | Country | Date |
|---|---|---|
| 268,982 | Great Britain | Apr. 14, 1927 |